Jan. 11, 1966

S. G. HANSEN ETAL

3,228,247

STATIC POSITION ERROR COMPENSATION
SYSTEM AND APPARATUS

Filed Aug. 28, 1962

INVENTORS
SAMUEL G. HANSEN
DAVID W STRATTON
BY

AGENT

INVENTORS
SAMUEL G. HANSEN
DAVID W. STRATTON
BY
AGENT

Jan. 11, 1966  S. G. HANSEN ETAL  3,228,247
STATIC POSITION ERROR COMPENSATION
SYSTEM AND APPARATUS
Filed Aug. 28, 1962  5 Sheets-Sheet 3

INVENTORS
SAMUEL G. HANSEN
BY DAVID W. STRATTON

AGENT

INVENTORS
SAMUEL G. HANSEN
DAVID W. STRATTON
BY
AGENT

United States Patent Office 3,228,247
Patented Jan. 11, 1966

3,228,247
STATIC POSITION ERROR COMPENSATION
SYSTEM AND APPARATUS
Samuel G. Hansen and David W. Stratton, Los Angeles, Calif., assignors to Douglas Aircraft Company, Inc., Santa Monica, Calif.
Filed Aug. 28, 1962, Ser. No. 219,911
14 Claims. (Cl. 73—389)

This invention relates generally to a simple and unique means for providing specific fluid static pressure level changes for various instruments that depend upon the sensing of fluid static pressure in their use. The invention finds particular advantage in connection with static pressure altitude systems useful in connection with bodies over which a fluid medium is in motion and relates more particularly to systems and apparatus for providing a measure of static pressure altitude that is corrected in accordance with various predetermined aerodynamic or fluid flow conditions existing relative to a body, such as aircraft, submarines, wind tunnels and models therein, fluid flowing in ducts and the like.

It has long been desirable to provide accurate measurement of the static air pressure existing about aircraft or other similar types of vehicles. Such static air pressure is commonly used in connection with the operating mechanism of altimeters, Mach number indicators, Mach trim instruments, automatic pilots, over-speed warning devices and the like. In order to obtain a measure of this static pressure, for use in connection with these and other types of instruments, it has also been common practice to employ various types of sensing devices, such as pitot tubes, flush-mounted static pressure sensing orifices, boom-mounted sensing devices and the like. All of these prior devices have provided a general measure of static pressure altitude with varying degrees of accuracy. Attempts at improvement of this pressure measurement have included considerable effort toward physically locating static pressure sensing devices at a position and in a manner to minimize errors inherent therein. However, with ever-increasing air traffic, the minimizing of position errors in instruments affected by static pressure measurement have become increasingly important. Even though such pressure sensing position errors may provide an altimeter error of only 100 feet, for example, for accurate navigation, air traffic control and the like, such seemingly minor errors cannot be tolerated.

Considering additional problems associated with altimeters commonly employed in aircraft, the systems known heretofore have made accurate pressure altitude detection very difficult, primarily in view of errors in the instrument scale and errors in the positioning of static pressure sensing elements or orifices on the aircraft. The scale errors result from the basic calibration accuracy of the altimeter and may, to some extent, be eliminated or modified through use of an air data computer system, which serves automatically to correct for scale error, or by use of a printed calibration card, graph or chart prepared for each altimeter on each particular aircraft. The errors produced by the position of sensing elements on the aircraft present a greater problem, inasmuch as it is extremely difficult and, in some cases, virtually impossible to determine proper location of a flash-type static sensing element on or adjacent to a skin surface of the aircraft. Such position must be such that the static pressure at the sensing element be completely free from error during various aircraft velocity conditions and during all other modes of flight. In aircraft utilizing an air data computer system in connection with altimeters, the elaborate computers that are normally employed make correction of errors not only difficult but the equipment used to solve the presented problems is also expensive and bulky. The indicated difficulty arises in connection with the correction of position error of the sensing orifice in all aircraft systems which utilize the measure of pressure altitude. In view of the expense and bulkiness of the computer equipment, contemporary air data systems are usually only used in connection with altimeters, thus leaving all other described systems uncorrected.

Various air traffic control groups and other aviation organizations have long been attempting to improve air traffic control. In order for such control to be completely effective, it is mandatory that means be provided for eliminating static position error of altitude pressure sensing elements on all aircraft, including military, commercial and private types. Accordingly, systems and devices for eliminating the described errors must be sufficiently simple and inexpensive to be economically available to owners of private, executive and small commercial aircraft, as well as to military organizations and major air carriers.

For purpose of the present description, the terms "position error" or "static position error" will be employed to indicate errors induced in static pressure measurement during various flight conditions and modes, as the result of the location of the static pressure pickup or sensing orifice or port relative to the aircraft or to a skin surface thereof.

The magnitude of static position error and the extent to which the geometry of the aircraft affects this error is dependent directly upon the location of the static sensing element or orifice on the aircraft. Accordingly, in prior systems and to some extent in the present system, every effort has been made to locate the orifice in an area on the fuselage or other component of the aircraft that is relatively free from errors induced by air turbulence or boundary layer air flow characteristics. The most desirable location on the aircraft for flush type sensing elements is first roughly determined by ground test surveys and thereafter by flight tests to provide an orifice location having the least amount of error and the least variation during all modes of flight. Thereafter the basic position errors that are still inherent in the sensing orifice may be compensated either manually through use of printed charts or through use of the described costly and complicated air data computers.

The basic position errors mentioned hereinbefore are characteristics of any given model of aircraft. However, even for a given model, there are particular position errors that vary from aircraft to aircraft. These are of relatively small but significant magnitudes, and are due to variations in the aircraft skin and/or structural discontinuities of the area surrounding the static orifices.

With the knowledge of the existence of such errors, it has been discovered that the mentioned basic and particular position errors may be compensated for by variations in the position of the static pressure sensing element relative to the surface of the aircraft, in a manner to cause the sensing element to protrude or to be recessed with respect to the surrounding skin surfaces. The system and apparatus of this invention takes advantage of this phenomenon to provide correction for position errors during all modes of flight, and for any particular aircraft.

While the foregoing and following descriptions and discussions are directed primarily to a system wherein air is the fluid medium, it is to be understood that the same principles described herein will apply irrespective of fluid medium which, in the case of use by a submarine or liquid flowing in a duct, may well be water or the like.

It is accordingly one object of the present invention to provide an improved static pressure sensing system and apparatus for use in connection with a moving vehicle, or for use on a stationary vehicle, or duct, whose surface is in contact with a moving fluid.

It is another important object of the invention to provide a system and apparatus for sensing static pressure about an object moving through air and to correct the position of a pressure sensing element in a manner to eliminate errors in measurement of the static pressure.

It is a further important object of the present invention to provide a static pressure altitude sensing system and apparatus, including means for altering the position of a sensing element or orifice relative to the surface skin of a vehicle in accordance with the velocity and other conditions concerning movement of the vehicle through the atmosphere.

Still another important object of the invention is to provide a static pressure altitude sensing system for use in cooperation with aircraft instruments to provide an accurate measure of static pressure surrounding the aircraft and for use in connection with operation of such instruments to eliminate errors in aircraft position and flight modes as indicated thereby.

Another object of the invention is to provide a static pressure sensing apparatus and system for use in connection with aircraft and including means responsive to areodynamic conditions of and about the aircraft for physically and automatically positioning a static pressure sensing orifice relative to a surface of the skin of the aircraft.

A still further important object of the invention is to provide a static pressure sensing system and apparatus, including novel sensing means positioned in cooperation with surface of the skin of the aircraft, together with compensating means enabling correction of the static pressure sensed thereby in accordance with aircraft operating characteristics and air flow paths thereover.

The particular uniqueness of the systems and apparatus of the present invention, compared to other air data computer systems, resides in the sensing element incorporated herein, this element being a very simple device that is, in essence, the computing unit of the system. This sensing element simultaneously corrects for pressure coefficient deviation, $\Delta P/q$, and transmits correct atmospheric pressure directly to an aircraft's normal static pressure lines. Other air data computer systems must additionally compute, in effect, dynamic pressure, $q$, which requires input signals from at least two other instruments, e.g., an altimeter and a Mach meter. These other systems also require a sensing pressure signal transformation between a static pressure sensing orifice and the corrected indicator instruments. Incorporation of the sensing element of this invention in an air data computer design results in the extensive improvements obtained in the system accuracy, reliability, flexibility, cost and compactness. It will be recognized that these improvements are due not only to the simplicity of the sensing element per se, but to the more simplified computer elements that may be required. It will be noted that the correcting of a particular position error involves merely a simple screw-type adjustment and/or the altering of only the simplest electrical or mechanical elements. In other heretofore known air data computer systems, such adjustment involves changes in prohibitively complex circuitry and cams. The present system and apparatus lends itself readily to modular-type design to enable use in the variety of described applications.

In accordance with one important and specifically described aspect of the present invention, a static pressure sensing element is positioned for movement relative and normal to the surface of the skin of an aircraft. Upon a determination of position errors encountered in normal flight of the aircraft, the sensing element is manually positioned and locked to provide at least some compensation for errors induced by the physical location of the port on the aircraft and the surrounding air flow conditions.

A further aspect of the invention includes the provision of means responsive to particular aerodynamic conditions, such as the position of the aircraft flaps, to position a static pressure sensing element in one of two distinct positions relative to the skin of the aircraft. In this aspect of the invention, remote programming of the position of the sensing element is accomplished by means of synchros and servomotors, with specific electrical biases applied thereto, the biases being switched upon predetermined movement of the flaps.

In a still further aspect of the invention, the position of the flush, static pressure sensing element is further positioned relative to the surface of the skin of an aircraft in accordance with an indication of aircraft velocity and the position of the flaps, this particular system being still further enhanced in another form of the invention by inclusion of a cam type control operating in conjunction with synchros and servomotors, to vary continuously the position of the sensing element or orifice during all modes of flight and also in response to a measure of aircraft velocity and flap position.

Further aspects of the invention relate to the use of the present system and apparatus in connection with a fixed body positioned in a moving fluid medium as in wind tunnel applications and for sensing characteristics of gaseous or liquid flows within ducts.

Other and further important objects, advantages and aspects of the invention will become apparent from the disclosures in the following detailed description, appended claims and accompanying drawings, wherein:

Figure 1:
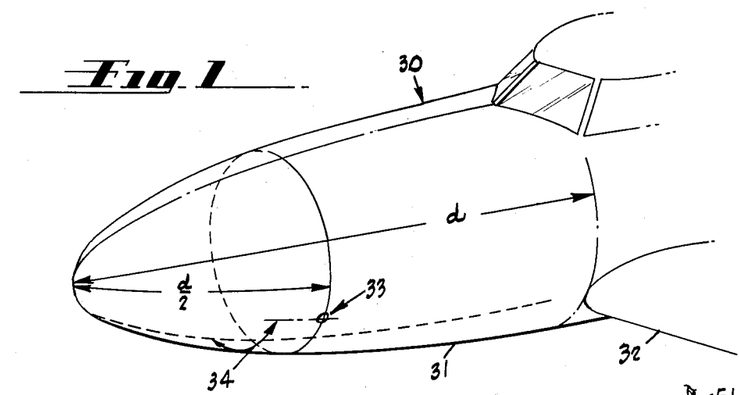
FIG. 1 is a perspective view showing a portion of an aircraft and a typical location of a static pressure sensing element or orifice thereon.

With reference to the drawings, and with reference primarily to FIG. 1, a typical installation situation for a static pressure sensing element is illustrated in connection with an aircraft indicated generally at 30. In this instance, given by way of example only, the aircraft 30 includes a fuselage 31 and a wing 32. The fuselage 30 has a portion which extends substantially forward of the leading edge of the wing 32 and, in such a particular instance, a typical location for a static pressure sensing element, indicated generally at 33, is approximately one-half of the distance from the forward end of the fuselage 30 to the leading edge of the wing 32 and in a circumference band in the order of 25° to 45° from a bottom center line of the fuselage, as illustrated at 34. This particular static pressure sensing element location, while being typical for the particular form of aircraft illustrated, will vary widely depending upon the aircraft structural characteristics and air flow patterns thereover. The particular location is selected to provide for static pressure sensing with the least amount of error which may be induced by the aerodynamic characteristics of the aircraft.

Figure 2:
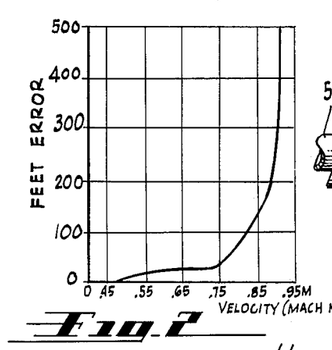
FIG. 2 is a graph showing typical static pressure errors encountered due to location of a sensing element on an aircraft.

With reference to FIG. 2, it may be seen that the heretofore known static pressure sensing elements or orifices have presented errors which may be translated into altimeter reading errors. It is to be noted that such errors in altimeter readings vary non-linearly as a function of aircraft velocity or Mach number. The curve represented by the graph of FIG. 2 is typical of such static position errors for one particular aircraft operating in one flight mode. These errors are therefore such as to require correction charts or graphs for each particular airplane and the non-linear characteristic of the variable makes attempts toward internal error compensation, within the altimeter instrument, extremely difficult. The systems and apparatus of the present invention serve to provide a more linear position error or actually to eliminate such error.

Figure 3:
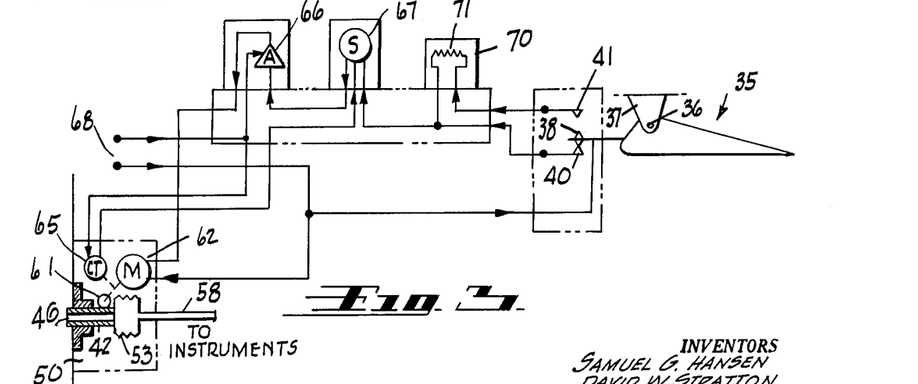
FIG. 3 is a diagrammatic view showing a simplified system for programming the position of a static sensing element or orifice in accordance with operational characteristics of an aircraft.
Figure 4:
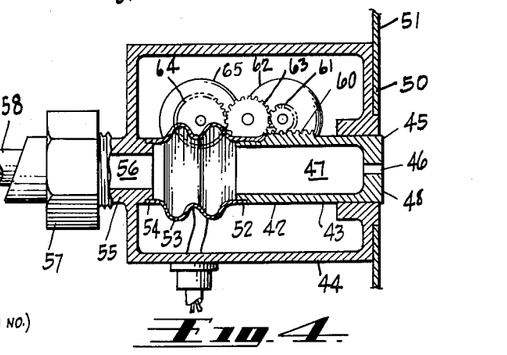
FIG. 4 is an enlarged sectional view showing one type of movable static pressure sensing element or orifice.

One system for accomplishing correction of static pressure position errors is illustrated in FIGS. 3 and 4. The system as represented in FIG. 3 is coupled to operation of flaps 35 of the aircraft and is particularly useful in instances wherein the position error of the static pressure sensing element may be offset by a fixed amount above and below a fixed Mach number. The flaps 35 are movable about a pivot 36 of a bracket 37 that is, in turn, secured to the aircraft. Movement of the flaps 35 from a retracted position to an extended position serves to move an electrical contact 38 between a pair of fixed contacts 40 and 41, these contacts forming a portion of the system. With reference to FIG. 4, in this form of the invention, a movable port member 42 is slidably disposed in an axially elongated cylindrical opening 43 in one end of a housing and bracket assembly 44. The port member 42 has an integral end wall 45 in which a sensing orifice 46 is centrally disposed and provides communication between ambient atmosphere and a chamber 47 formed within the port member 42. The port member 42, and a planar outer surface 48 of the end wall 45, is movably disposed relative to an outer surface 50 of the skin 51 of the aircraft. An inner end of the member 42 is secured, as at 52, to an annular flexible member 53, the other end of which is secured as at 54 to a fitting 55 formed integrally with the bracket assembly 44. The fitting 55 has a passageway 56 therein and is adapted for reception of a fitting 57 that is connected to a conduit 58 which extends directly to instruments (not shown) of the aircraft or to other points of use of static atmospheric pressure.

The port member 42 of the static pickup arrangement further includes a longitudinally extending gear rack 60 on an outer surface thereof, the rack being adapted for cooperation with a gear 61 that is coupled to and adapted to be driven by a synchronous motor 62. The gear 61 is also coupled through an idler gear 63 to a gear 64 that is coupled to and adapted to drive a synchro control transformer 65.

As shown also in FIG. 3, the motor 62 and control transformer 65 are suitably connected through an amplifier 66 to a synchro 67, energy for the system being provided through a suitable A.C. input as at 68. A resistance unit 70 is also provided and suitably connected to the contacts 40 and 41 whereby, when the contact 40 is engaged by the contact 38, the resistance unit 70 is bypassed, whereas, when the contact 41 is engaged by the contact 38, upon extension of the flaps 35, a suitable fixed resistance as at 71 is coupled into the control circuit to determine the position of the synchronous motor 62 and synchro 67. In this connection, the synchronous motor 62 and synchro 67 are of the well-known type and are electrically interconnected in a conventional manner whereby movement of the shaft of the synchro will effect substantially simultaneous and like movement of the shaft of the synchronous motor. Accordingly, the surface 48 of the port member 42 and likewise, the outer end of the sensing port 46, will be positioned at one of two locations relative to the surface 50 of the aircraft skin 51 depending upon aerodynamic conditions surrounding operation of the aircraft as interpreted by the position of the flaps 35. Specifically, at low aircraft speeds, the outer end of the sensing orifice 46 will be positioned essentially contiguous with the surface 50 of the aircraft skin 51 and will be positioned to protrude outwardly beyond the surface 50 at high aircraft speeds. These speeds are largely determined by the position of the flaps 35 or deliberate extension of the flaps by aircraft operating personnel, the resistance 71 being bypassed during high speed operation and inserted in the motor control circuit during low speed operation.

In a few minor instances, it has been found that advantage may be taken of orifice sensing characteristics when positioned at various distances in relation to the surface of the skin of the aircraft. In types of aircraft which normally operate at relatively low speeds, the sensing orifice may be fixedly positioned to compensate for position error, a suitable structure being illustrated in FIG. 5. In this form of invention, a movable element 72 threadably engages a body 73 and has an end surface 74 that is positioned relative to a surface 75 of the skin 76 of the aircraft. After establishment of the necessary correction by the techniques described hereinbefore, the element 72 is fixed in position by means of a set screw 77 and, in a manner similar to that described hereinbefore, the body 73 is connected to a conduit 78 by means of a suitable fitting 80. In this form of the invention, it is to be noted that the surface 74 and accordingly the outer end of a sensing orifice 81 is positioned at a distance from the surface 75 as determined by test results and actual flight of the aircraft, this particular distance providing a general correction of the position errors.

Figures 5, 6, 7, 8, 9:
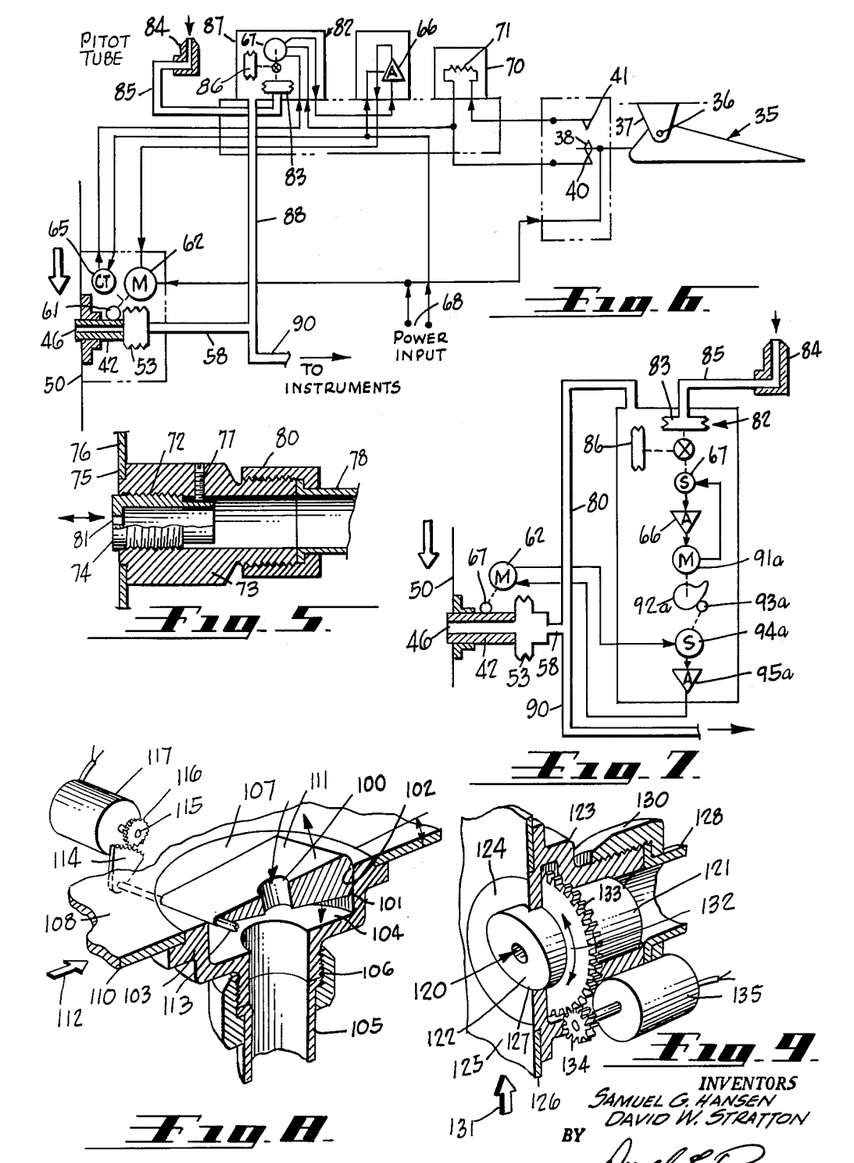
FIG. 5 is a sectional view showing a further type of static pressure sensing orifice.
FIG. 6 is a diagrammatic view sismlar to FIG. 3, illustrating a further system for programming a static pressure sensing element or orifice in accordance with factors surrounding operation of an aircraft.
FIG. 7 is a diagrammatic view illustrating a still further system for programming the position of a static pressure sensing element or orifice.
FIG. 8 is a perspective view showing a modified form of a static pressure sensing element or orifice.
FIG. 9 is a perspective view showing another form of movable static pressure sensing element or orifice.
Figure 27:
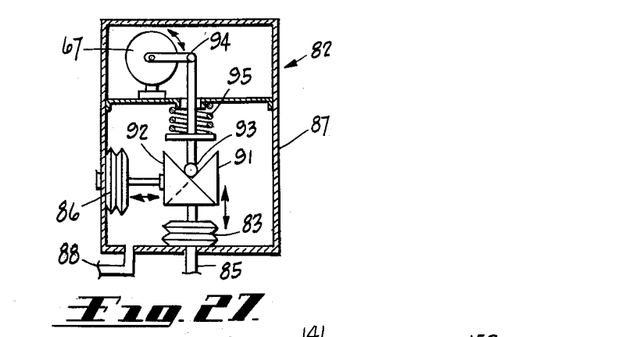
FIG. 27 is a partially diagrammatic view illustrating a simplified means for integrating mechanical outputs from a pair of movable sensing devices.

In FIG. 6 a form of the invention is illustrated that is similar to the form of the invention illustrated in FIG. 3, including the dual position arrangement having a relation to the position of the flaps 35. This system is particularly useful in instances where the position error is constant as a function of Mach number and is offset by a fixed amount as a result of a change of flap position setting in low speed regions of an aircraft. The system of FIG. 6 is substantially identical with that of FIG. 3 and like parts and elements of the system are indicated by similar reference numerals. An exception in this form of the invention resides in the inclusion of a Mach transducer indicated generally at 82. Mach transducers as illustrated at 82 are well-known and generally include a bellows arrangement 83 that is responsive to pressure as sensed by a pitot tube 84 through a conduit 85. A second bellows 86 is positioned within a chamber 87 and is responsive to static pressure as sensed by the orifice 46, as communicated thereto by means of a conduit 88. The conduit 88 is coupled to the conduit 58 and to a conduit 90 which extends to the aircraft instruments or other points of use of static pressure. The bellows 83 and 86 are illustrated in FIG. 27, the movable outputs from which are integrated as, for example, through a pair of wedges 91 and 92, respectively, which cooperate with a transversely disposed bar 93 that is, in turn, connected to a crank 94 which controls the position of the shaft of the synchro 67. The bar 93 is biased into the contact with the wedges 91 and 92 by means of a compression spring 95.

The arrangement illustrated in FIG. 27 is by way of example only and serves to provide an integrated positioning of the shaft of the synchro 67 in accordance with aircraft Mach number velocity. Accordingly, in the system of FIG. 6, the position of the outer end of the static pressure sensing orifice 46 relative to the skin surface 50 is continuously programmed in accordance with aircraft velocity, which is proportional to Mach number, as well as positioned incrementally in accordance with flap position at low aircraft speeds. The static position error compensation is more adequate in the form of the system illustrated in FIG. 6 over that of the system illustrated in FIG. 3 or the non-programmed position compensating means illustrated in FIG. 5. Further, in this form of the invention, it is to be noted that at all Mach numbers in which the flaps are at zero degrees of extension, a correction factor that is constant with Mach number is made to the position of the static pressure sensing element. When the flaps are lowered to a predetermined angle, the bias or resistance 71 is switched into the circuit, thus altering the measure of pressure by a fixed amount. It is to be understood that the bias or resistance 71 may be fixed, as shown, or variable with flap position as through use of a suitable potentiometer (not shown).

With reference to the form of the invention shown in FIG. 7, this particular system is useful primarily in instances where the errors established by the physical location of the static pressure sensing element are variable with Mach number, and differs from the form of the invention illustrated in FIG. 6 in that a signal produced as the result of varying Mach number is coupled between a synchro and a synchronous motor through a variable mechanism such as a cam. In all other respects, the form of the invention illustrated in FIG. 7 is identical with that illustrated in FIG. 6 and similar reference numerals are used to identify similar components. As shown, a heretofore described Mach transducer 82 has an integrated output which serves to position the shaft of the synchro 67, the electrical output of which is conducted through the amplifier 66 to a synchronous motor 91a. The motor 91a is servoed back to the synchro 67 and the mechanical output thereof serves to drive a cam 92a. A follower 93a, engageable with the cam 92a, serves to position the shaft of a second synchro 94a that is electrically connected to the synchronous motor 62 through a suitable amplifier 95a. As described hereinbefore, the motor 62 serves to drive the gear 67 to position the port member 42 and the outer end of the orifice 46 relative to the surface 50. As to the cam 92a, this cam is suitably shaped to correct for position error of the static pressure sensing element or orifice as a function of Mach number. The cam 92a thus provides a variable bias to the servo loop including the synchro 94a and the synchronous motor 62 which serve to position the port 46 relative to the surface 50.

The various systems, as described hereinbefore in connection with FIGS. 3, 6 and 7 respectively, may be more completely understood by reference to the series of diagrammatic illustrations and graphs of FIGS. 10 through 26 inclusive. In these various illustrations and graphs, the depicted curves represent pressure errors that have been plotted as a function of a pressure co-efficient, $\Delta P/q$, with these curves being related to a given aircraft operating situation in which the position errors may be corrected. It is to be noted that in those graphs representing correction in accordance with flap deflection, such deflection is indicated in degrees, is represented by the symbol $\delta$, is related to the angle of attack in degrees as represented by the symbol $\infty$ and to Mach number as represented by the symbol M. Additionally, in a portion of these illustrations, upper and lower allowable limits, as prescribed by aircraft operating authorities, are also illustrated. In a portion of the graphs indicating such limits, for clarity, only one set of such limits is illustrated, with each of the upper and lower limits being associated with individual curves representing particular flap deflection angles.

Figure 10:
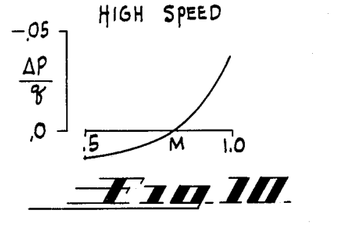
FIGS. 10 through 26 inclusive are a series of diagrammatic illustrations and graphs showing various typical position errors encountered under different operating conditions and positions of sensing elements or orifices, and the corrections provided by the systems and apparatus of the present invention.
Figure 11:
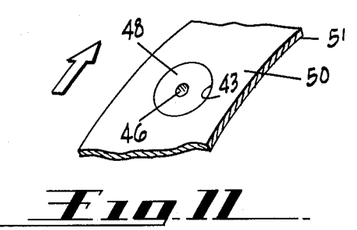
Figure 12:
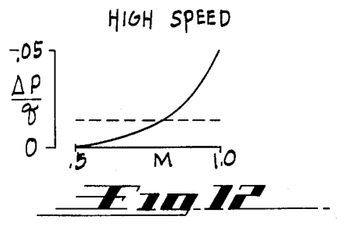
Figure 13:
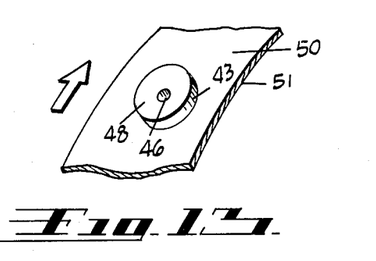

With reference specifically to the illustrations and graphs, FIG. 10 illustrates a typical example of the high speed static pressure characteristics surrounding the sensing element or orifice 46 when disposed with the surface 48 of the movable member co-extensive with the surface 50 of the aircraft skin 51, as diagrammatically illustrated in FIG. 11. These characteristics correspond substantially identically to those of any conventional flush mounted static pressure sensing element which may be installed at the same position on an aircraft. In FIG. 12 there is illustrated the static pressure characteristics when the same sensing element is disposed above the surface 50 of the skin 51, as illustrated in FIG. 13. The effect of such disposition of the sensing element is to displace the characteristics shown in FIG. 10 by a constant negative increment, i.e., a negative displacement of pressure level. The converse holds true for the characteristics upon displacement of the sensing element below the surface of the skin 50, as illustrated respectively in FIGS. 14 and 15. In these diagrammatic illustrations, it is to be noted that a positive pressure level displacement results when the sensing element is disposed in a recessed position.

Figure 16:
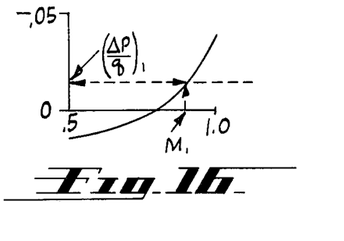
Figure 17:
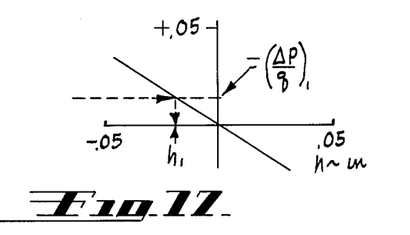

With reference primarily to FIGS. 16 and 17, there is illustrated in these graphs the aerodynamic aspects of achieving static pressure position error compensation. As shown in FIG. 16, for a given flight speed and Mach number $M_1$, the static pressure error $$\left(\frac{\Delta P}{q}\right)_1$$

is as indicated by the dotted arrows. FIG. 17 illustrates a typical static pressure variation with sensing element protrusion height, $h_1$, for a movable sensing element as determined for a position error free flow field. Hence, in order to cancel out the error, it is required that the compensating pressure be equal in magnitude, but opposite in sign, to $$\left(\frac{\Delta P}{q}\right)_1$$

Figure 14:
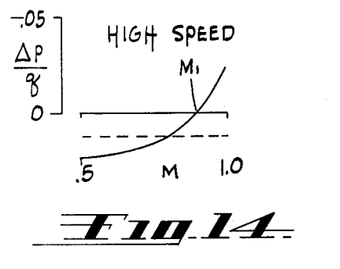
Figure 15:
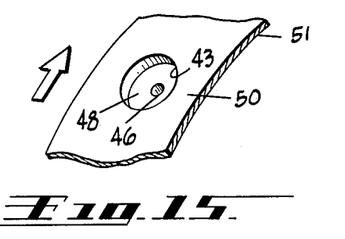

The dotted arrows in FIG. 17 depict the necessary recession of the sensing element head to satisfy this condition. Once such condition is satisfied, the resulting static pressure characteristics will be as shown in FIG. 14. Furthermore, since the characteristic curves of FIGS. 16 and 17 may readily be determined for a given aircraft installation, a corresponding computer system may then be provided to accomplish the static pressure position error compensation over an entire flight speed range.

Figure 18:
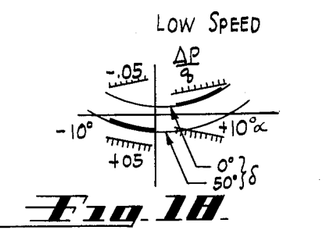
Figure 19:
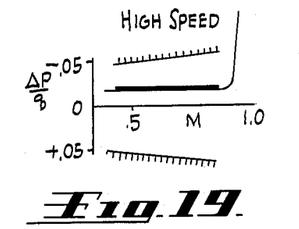
Figure 20:
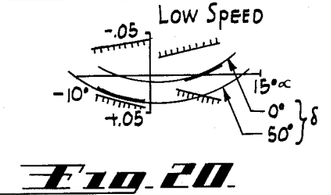
Figure 21:
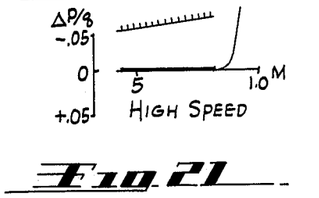
Figure 22:
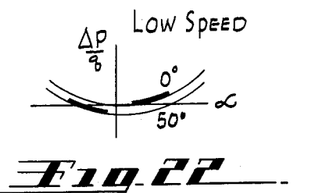

FIGS. 18 and 19 illustrate a typical set of curves depicting uncorrected airplane static pressure characteristics in both the lower speed and the high speed flight regimes, respectively. Since the illustrated curves in both of these regimes lie well within the tolerable position errors, the use of elaborate air data computers is not economically attractive. However, through use of the extremely simple sensing element of this invention in a fixed position, in accordance with the form of the invention illustrated in FIG. 5, position error is substantially entirely eliminated over the normal operating high speed flight regime and are still tolerable in the low speed regime, as depicted in the corrected curves of FIG. 20 and 21 respectively. Furthermore, by addition of a simple flap switch, as in the form of the invention in FIG. 3, the corrected characteristics of FIGS. 18 and 19 will appear practically free from error over the entire normal flight spectrum, the resulting low speed characteristics being substantially as shown in FIG. 22. The high speed characteristics will remain substantially unchanged from those illustrated in FIG. 21.

Figure 23:
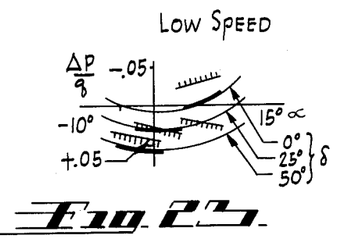
Figure 24:
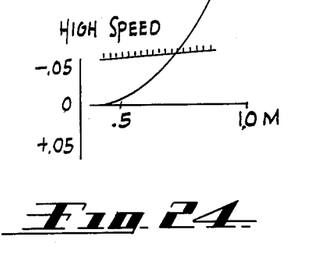
Figure 25:
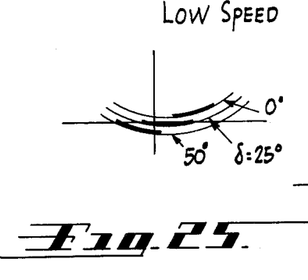
Figure 26:
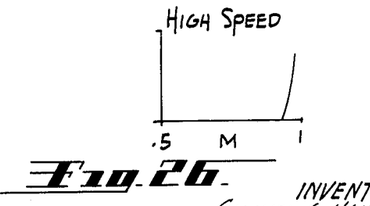

Another typical set of uncorrected aircraft static pressure characteristics is illustrated in FIGS. 23 and 24. In this instance, a system incorporating a Mach transducer and/or a cam arrangement, similar to those of the systems illustrated in FIG. 6 and FIG. 7, results in the characteristics illustrated graphically in FIGS. 25 and 26, respectively.

It is to be noted that the amount and accuracy of the correction afforded by the systems of the present invention are directly proportional to the complexity of the systems. In actual practice, a determination is first made as to the most desirable location of a static pressure sensing element or orifice at or substantially coextensive with the skin surface of the aircraft, and a determination is made as to the amount and type of position error that is anticipated. Thereafter, only the necessary equipment or portions of the present invention need be utilized to provide the necessary and/or desirable corrections for static pressure used by the aircraft instruments, or elsewhere. In some instances where the position error is zero below certain flap angles and is another value above such flap angles, then only a flap switch, similar to that represented by the contacts 38, 40 and 41, need be used. In such instances, below a certain flap angle, there would be no correction and above that flap angle there would be a fixed bias correction, as in the system in FIG. 3. This system is by far the simplest of the disclosed systems and it may be seen that the various aspects of any or all of the systems may be incorporated in different combinations as desired to provide appropriate correction of static pressure measurements.

As illustrated in FIGS. 8 and 9, the physical static pressure sensing element or orifice and the manner of alternating the position of the outer end of this orifice relative to the surface of the skin of an aircraft may take various forms. For example, in FIG. 8, a static pressure sensing orifice is illustrated at 100 and carried by a wedge-shaped member indicated generally at 101. The member 101 is generally rectangular and disposed in a suitable rectangular opening 102 in a fitting 103. The opening 102 and the orifice 100 communicate with a chamber 104 that is, in turn, coupled to a conduit 105 secured to the fitting 103 by means of a coupling member 106. In this instance, the fitting 103 has an outer surface 107 that is substantially coextensive with a surface 108 of a skin 110 of an aircraft, and flow of air over the surface 108 and over a planar surface 111 of the member 101 being, for example, in the direction of the arrow 112. The port 100 is positioned at various distances from the surface 108 by movement about a pivot defined by a shaft 113 that is connected to a gear sector 114 that is, in turn, operatively coupled to a spur gear 115 connected to an output shaft 116 of a suitable motor such as a synchronous motor 117. The motor 117 may be of the type illustrated at 62 in the various forms of the invention and serves to control the position of the surface 111 relative to the surface 108 and similarly the relationship of the port 100 to the surface 108. In this form of the invention, it is to be noted that movement of the member 101 is such as to change the plane of the surface 111 in an angular manner relative to fixed portions of the fitting 103 and surface thereof.

In FIG. 9 a still further form of the invention is shown wherein a port 120 is formed in a generally tubular member 121 having a closed end defining a surface as at 122. The end surface 122 is disposed at an angle to an axis of the member 121, with the port 120 being positioned on this axis and having an end at the surface 122. The member 121 is rotatably journaled in a fitting 123 that has an outer surface 124 that is positioned substantially coextensive with a surface 125 of an aircraft skin 126. Additionally, one edge, as at 127, of the surface 120 is aligned with the outer surface 124 of the fitting 123. The interior of the member 121 communicates with a passage structure 128 that is coupled to the fitting 123 by means of a coupling element 130. In order to alter the flow pattern of air in, for example, the direction of the arrow 131 over and in conjunction of the orifice or port 120, the member 121 and the surface 122 thereof are rotated in direction represented by the arrow 132. For this purpose, a spur gear 133 is secured to the member 121 and is adapted to mate with a second spur gear 134 that is coupled to and adapted to be driven by a synchronous motor indicated at 135. The motor 135 may also be similar to the hereinafter described motor 62. It may thus be seen that while the distance of the outer end of the port 120 from the surface 125 of the skin 126 is not changed by rotation of the member 121, the angular disposition of the surface 122 relative to the axis of the member 121 and direction of air flow indicated by arrow 131, serves to change the flow characteristics of air over the open end of the orifice or port 120. In other words in the position shown in FIG. 9, a higher pressure will be recorded and delivered to the conduit 128, and hence to the instruments of the aircraft, then when the member 121 is rotated through an angle of 180° or less. It may thus be seen that at some intermediate position between the position illustrated in FIG. 9 and that represented by a 180° rotation of the member 121 will serve to provide for position error correction and that such a position may be determined by operation of the motor 135 as servoed from other portions of the system in which the apparatus is used.

In both the forms of the invention illustrated in FIGS. 8 and 9, as well as the form illustrated in FIG. 4, the surfaces of the moving member surrounding the static pressure sensing element or orifice has been illustrated and described as being relatively flat and extending either normal to or angularly from outer end edge of the port. It is clear that such surfaces may also be suitably contoured either in one or two planes and means may be provided for either moving the position of the port in a direction substantially normal to a surface of the aircraft or pivotally about an axis which may lie at or adjacent to said surface. The basic criteria in practicing this invention resides in the provison of a port, the locaton or attitude of which may be determined and fixed or altered in accordance with controlled changes in at least one aerodynamic characteristic surrounding operation of the aircraft and movement thereof through the air.

Figure 28:
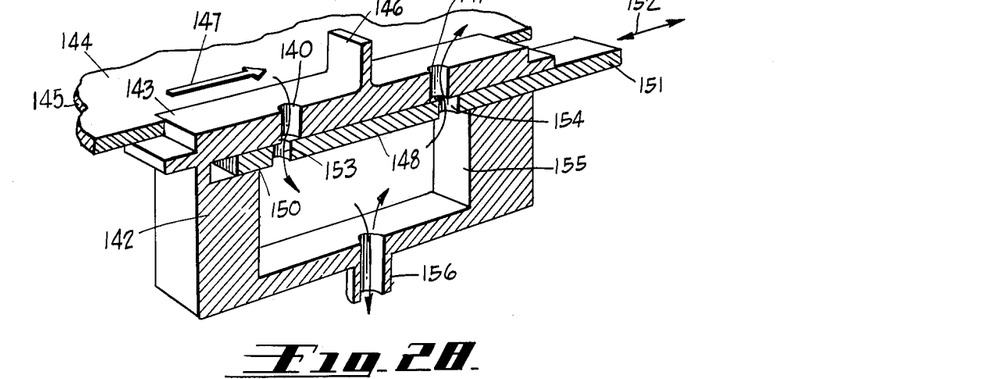
FIG. 28 is a perspective view illustrating an apparatus employing a pair of sensing orifices for use in the systems of the present invention.
Figure 29:
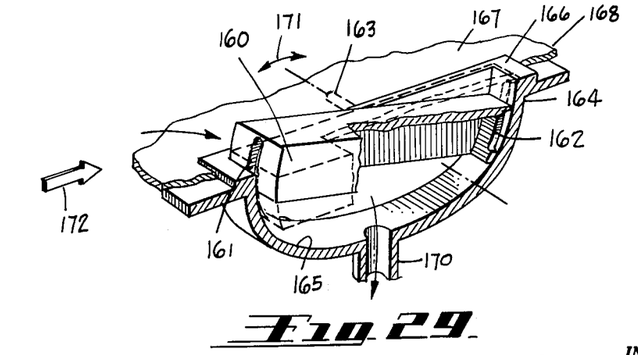
FIG. 29 is a perspective view illustrating a modified form of the dual orifice pressure sensing arrangement of FIG. 28.

With reference to FIGS. 28 and 29, it may be seen that the error compensation of the present system may also be accomplished by integrating at least two measures of static pressure that are respectively greater and less than actual static pressure. As shown in FIG. 28, a pair of orifices 140 and 141 are provided in a closed body indicated at 142 and having an upper surface 143. The surface 143 is coextensive with a surface 144 of the aircraft skin 145. Additionally, a partition plate 146 is disposed between the orifices 140 and 141 with the directional flow of air being, for example, as indicated by the arrow 147. The body 142 further serves to support a slide plate 148 that is disposed in a suitable slot 150 therein and has an operating portion 151 extending therefrom. The plate 148 is movable in the directions of the arrow 152, as by any suitable means, such as a synchronous motor (not shown), as described in connection with other illustrated forms of the invention. The plate 148 has a pair of openings 153 and 154 therein which are generally aligned with and have a longitudinal spacing that is greater than a longitudinal spacing between the ports 140 and 141. The body 142 is also provided with a chamber 155 that is in communication with the openings 153 and 154 and is also connected to a suitable passage structure 156 which may extend to the aircraft instruments, or elsewhere. It may be seen that a pressure greater than static atmospheric pressure will be sensed at the port 140 and a pressure less than static atmospheric pressure will be sensed at the port 141, inasmuch as the partition plate 146 is disposed therebetween. Accordingly, a correction of static position error may be made by suitable and selective throttling of the ports 140 and 141, by movement of the plate 148, an integration of these pressures being provided in the chamber 155 and delivered through the passage structure 156. The plate 148 may be positioned in accordance with various operating conditions of the aircraft and static position errors encountered in the sensing of static pressure.

A similar structure is illustrated in FIG. 29 wherein a generally box-like rocker bar 160 is provided with slot type openings 161 and 162 at opposite ends thereof. The bar 160 is connected to and pivoted about a shaft 163 carried by a body member 164 having a semicircular recess or cavity 165 therein. Outer ends of the bar 160 are shaped to conform to the curvature of the recess 165 as defined about an axis of the shaft 163. Additionally, an upper surface 166 of the body 164 is disposed slightly above a surface 167 of the aircraft skin 168 and when parallel therwith, will expose like area portions of the openings 161 and 162 above the surface 166 of the body 164. Further, the recess 165 communicates with a passage structure 170 which may extend to the aircraft instruments or elsewhere. It may thus be seen that the rocker bar 160 may be pivoted about the axis of the shaft 163 in the directions indicated by the arrow 171 and, upon a flow of air in the direction of the arrow 172, for example, when the bar 160 is in the position illustrated in FIG. 29 a positive pressure will be sensed through the portion of the slot 161 extending above the surface 166 and a negative pressure will be sensed through the portion of the slot 162 which extends above the surface 166. These pressures are then integrated in the chamber or recess 165 and communicated, by way of the passage structure 170, to the instruments of the aircraft or to such other place as may be desirable or necessary within the aircraft. It is further to be noted that when the slot 162 is closed off in a down position, variations in positive pressure are still achievable at the slot 161 due to variations in the local pressure field. The converse is also true, i.e., when the slot is above the skin surface and the slot 161 is closed off.

Like the various and many devices that may be employed to move a single or multiple orifice or port arrangement relative to a surface of the aircraft, many different arrangements may be developed similar to those of FIGS. 28 and 29 for integrating pressures derived from at least one pair of ports to provide in integrated measure of static pressure that may be altered to correct for errors therein that become inherent during different operating characteristics and velocities of the aircraft.

In view of the foregoing, it may be seen that the present static position error compensating system and apparatus provides means whereby both coarse and fine static position error compensation may be accomplished depending upon the necessities therefor, and requirements for operation of the aircraft. As indicated hereinbefore, in most instances, it is desirable to provide as complete compensation as possible in order that aircraft operating in congested traffic patterns and areas may do so with a greater degree of safety than heretofore available. It may also be seen that the systems hereof are relatively simple and are further relatively inexpensive, and that such items as the amplifier 66, synchro 67, resistance unit 70 and Mach transducer 82 may be constructed and mounted in a modular manner on a common chassis for positioning within an aircraft. Further, it may be seen that the connections between components, the added components and the added weight thereof are held to a minimum, especially when considered in the light of prior known structures of greater complexity and intended for static pressure error compensation. Additionally, while a single sensing port or a pair of ports or orifices used in the compensating system have been shown and described, it is clear that a plurality of ports arranged in any desired pattern may be used and such ports may have any desired outline configuration without departing from the spirit and scope of the present invention. Still further, it is clearly apparent that modifications may also be made in the detail illustrated and described mechanizations of the invention, linkages and methods of moving the static pressure sensing elements or orifices.

As discussed hereinbefore, the present system and apparatus may be employed with wind tunnels. In such an instance it will be recognized that the sensing element may be carried by a wall of the tunnel and preferably forward of a test section. All instrumentation described may then be associated with the sensing element and instruments such as the commonly used manometers are thus automatically free from tunnel calibration errors.

Having thus described the invention and the present several embodiments of the systems and apparatus thereof, it is desired to emphasize the fact that many still further modifications may be resorted to in a manner limited only by a just interpretation of the following claims.

We claim:
1. In a static pressure system useful in providing a corrected measure of static atmospheric pressure about a moving body, the combination of:
  means for sensing static atmospheric air pressure adjacent a surface of said body, said sensing means being mounted adjacent the surface of said body; and
  means responsive to a controlled change in a function involving at least one aerodynamic characteristic, including velocity and angle of attack characteristics, of said body and independent from said sensing means for altering pressure sensed by said sensing means through movement of at least a portion of said sensing means relative to the surface of said body to provide said corrected measure of static atmospheric pressure.

2. A static pressure system useful in providing a corrected measure of static atmospheric pressure about a moving body, comprising:
  means including at least one sensing port for sensing atmospheric air pressure adjacent a surface of said body, said sensing port being mounted adjacent the surface of said body;
  means for changing at least one of the aerodynamic characteristics including velocity and angle of attack surrounding movement of said body; and
  means responsive to operation of said changing means for positioning an outer end of said sensing port relative to the surface of said body to provide said corrected measure of static atmospheric pressure.

3. A static pressure system useful in providing a corrected measure of static atmospheric pressure about a moving body, comprising:
  means movable substantially normal to a surface of said body for sensing atmospheric air pressure adjacent said surface;
  means for moving said sensing means; and
  means responsive to a controlled change in a function involving at least one aerodynamic characteristic, including velocity and angle of attack characteristics of said body and independent from said sensing means for controlling operation of said moving means whereby to provide said corrected measure of static atmospheric pressure by said sensing means.

4. In a static pressure sensing system adapted for use in connection with an aircraft having an exterior surface and control elements differently positionable at different velocities of the aircraft through the ambient atmosphere, the combination with said aircraft of said static pressure sensing system comprising:
  statis pressure sensing orifice means, said orifice means being carried by said aircraft adjacent a surface thereof and movable relative thereto;
  means operable in conjunction with said orifice means to move the same and alter the static pressure sensed by said orifice means; and means for controlling said pressure altering means in accordance with different positions of said control elements to move said orifice means whereby the static pressure sensed by said orifice means is altered in accordance with the different velocities of said aircraft through the ambient atmosphere.

5. A static pressure sensing system according to claim 4 wherein said static pressure sensing orifice means comprises a movable element having a sensing port, said altering means including means for changing a relationship of said port relative to said aircraft surface.

6. A static pressure sensing system according to claim 4 wherein said controlling means includes servo means connected in a servo loop and responsive to said different positions of said control elements, for controlling operation of said altering means to alter the static pressure sensed by said orifice means whereby corrected static pressures are provided for said aircraft at all of said different positions of said control elements.

7. A static pressure sensing system according to claim 4 wherein said static pressure sensing orifice means comprises an element having at least one port therein, an open outer end of said port being positioned in a plane substantially coextensive with said surface of said aircraft, said element being movable substantially normal to said surface whereby to alter said static pressure sensed at said port.

8. A static pressure sensing system according to claim 4 wherein means are provided for sensing and providing a measure of velocity of said aircraft through said ambient atmosphere; and means for biasing said controlling means in accordance with said measure of velocity whereby said pressure altering means is also controlled according to velocity of said aircraft.

9. A static pressure sensing system according to claim 6 wherein a fixed bias resistance is provided, said controlling means being operable selectively to couple said resistance into said servo loop upon movement of said control elements to a predetermined position thereof whereby said servo means responsively controls said pressure altering means to alter said static pressure sensed by said orifice means in accordance with the bias value of said resistance.

10. A static pressure sensing system and apparatus useful in providing a corrected measure of static pressure sensed about an aircraft moving through the atmosphere and in providing the static pressure sensed thereby to points of use in the aircraft, said system and apparatus comprising:

an aircraft having an outer surface;

a static pressure sensing element movably carried by said aircraft and having an end surface and pressure sensing port means open at said end surface, said end surface being positioned substantially coextensive with said outer surface of said aircraft;

an aircraft attitude control element carried by said aircraft and selectively movable relative thereto; and means including a servo loop responsive to predetermined movements of the control element and coupled between said control element and said pressure sensing element whereby to position said end surface and said sensing port at different predetermined positions relative to said outer surface of said aircraft in accordance with changes in attitude of the aircraft and therefore correctively alter said measure of static pressure sensed thereby and delivered to said points of use.

11. A system in accordance with claim 10 wherein said means including said servo loop further includes an electrical resistance element forming a bias coupled to said loop; and means connected to said control element for changing the bias offered to said loop by said resistance element.

12. A system in accordance with claim 10 wherein Mach number sensing means are provided to sense and provide a measure of velocity of said aircraft through said atmosphere; and means for coupling an output from said Mach number sensing means to said servo loop whereby further to change the position of said sensing port relative to said outer surface of said aircraft and thereby further correctively alter said measure of static pressure.

13. A system in accordance with claim 10 wherein said static pressure sensing element comprises a tubular member;

an expansible connector connected to said member and having an interior chamber open to the interior of said tubular member;

passage means connecting said chamber with said point of use in said aircraft; and means coupled to said servo loop for moving said member in a direction substantially parallel to an axis thereof.

14. A system in accordance with claim 10 wherein said static pressure sensing element comprises a tubular member, said end surface thereof being positioned and arranged for movement out of said substantial coextensive relationship with said outer surface of said aircraft.

References Cited by the Examiner

UNITED STATES PATENTS

| | | | |
|---|---|---|---|
| 2,554,634 | 5/1951 | Paine et al. | 73—212 |
| 2,604,786 | 7/1952 | Huzel | 73—388 |
| 2,713,267 | 7/1955 | Wallace | 73—388 |
| 3,029,636 | 4/1962 | Mullins | 73—178 |
| 3,086,599 | 4/1963 | Brown | 83—178 |

LOUIS R. PRINCE, *Primary Examiner.*

JOSEPH P. STRIZAK, RICHARD C. QUEISSER,
*Examiners.*